(12) United States Patent
Reason et al.

(10) Patent No.: US 6,226,998 B1
(45) Date of Patent: May 8, 2001

(54) VOLTAGE CONTROL USING ENGINE SPEED

(75) Inventors: John Robert Reason, Liverpool; Joao Eduardo Navarro de Andrade, Cicero, both of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/277,507

(22) Filed: Mar. 26, 1999

(51) Int. Cl.⁷ ...................................... F25B 49/02
(52) U.S. Cl. ........................ 62/230; 62/323.3; 62/228.4
(58) Field of Search ..................... 62/230, 228.4, 62/228.1, 323.1, 323.3, 323.4

(56) References Cited

U.S. PATENT DOCUMENTS

| | | | |
|---|---|---|---|
| 3,214,931 | * 11/1965 | Petranek | 62/323.4 X |
| 4,134,272 | 1/1979 | Reimann | 62/115 |
| 4,735,055 | 4/1988 | Taylor et al. | 62/115 |
| 4,903,495 | 2/1990 | Howland et al. | 62/81 |
| 5,067,556 | 11/1991 | Fudono et al. | 165/29 |
| 5,199,274 | * 4/1993 | Yoshida et al. | 62/230 X |
| 5,291,745 | 3/1994 | Hanson | 62/89 |
| 5,546,756 | 8/1996 | Ali | 62/204 |
| 5,557,938 | 9/1996 | Hanson et al. | 62/126 |
| 5,598,718 | 2/1997 | Freund et al. | 62/238.6 |
| 5,625,276 | 4/1997 | Scott et al. | 322/24 |
| 5,626,027 | 5/1997 | Dormer et al. | 62/175 |
| 5,628,205 | 5/1997 | Rockenfeller et al. | 62/480 |
| 5,661,378 | 8/1997 | Hapeman | 318/52 |
| 5,715,704 | 2/1998 | Cholkeri et al. | 62/527 |
| 5,771,703 | 6/1998 | Rajendran | 62/204 |
| 5,780,998 | 6/1998 | Scott et al. | 322/46 |
| 5,798,577 | 8/1998 | Lesesky et al. | 307/10.7 |
| 5,867,998 | 2/1999 | Guertin | 62/225 |

* cited by examiner

Primary Examiner—Harry B. Tanner
(74) Attorney, Agent, or Firm—Niro, Scavone, Haller & Niro

(57) ABSTRACT

An process and method for monitoring and limiting high voltage conditions in a transport refrigeration unit is disclosed. The system provides a microprocessor control which monitors the load, generator temperature and engine speed and compares it to an algorithm or map programmed into a controller for the unit. The map or algorithm preferably predicts voltage based upon load (amperage), generator temperature and engine speed. If the result of the monitored features predicts a voltage above preselected acceptable levels which are programmed into the controller, then the controller will drop the engine into low speed.

5 Claims, 4 Drawing Sheets

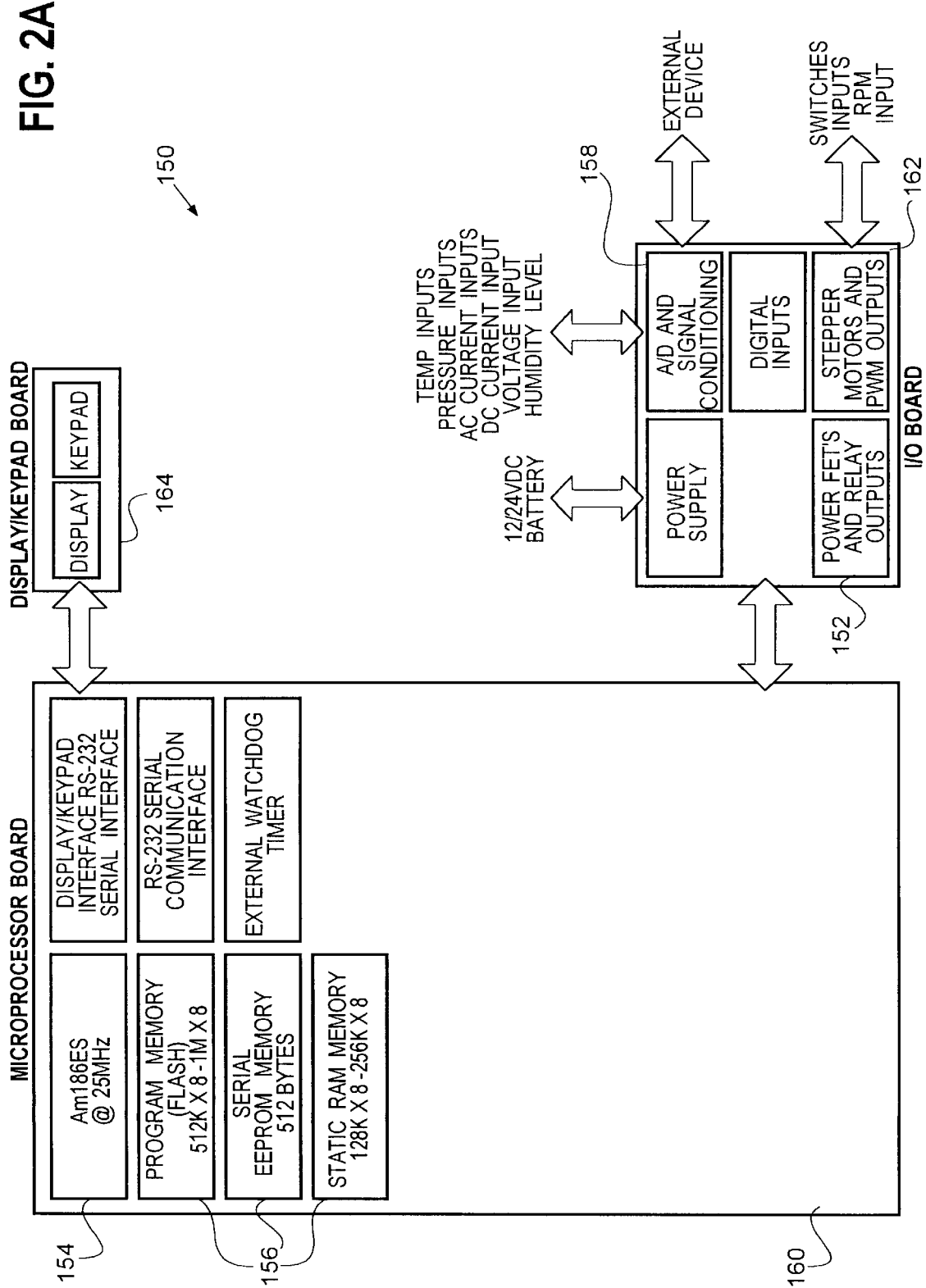

VOLTAGE CONTROL USING ENGINE SPEED

FIELD OF THE INVENTION

The field of the present invention relates to control systems for transport refrigeration systems. More specifically, the present invention is directed towards monitoring the generator current of a transport refrigeration system and, using a function derived from previous testing of operating conditions versus voltage, forcing the unit into low speed whenever high generator voltage conditions are predicted to occur.

DESCRIPTION OF THE PRIOR ART

A transport refrigeration system used to control enclosed areas, such as the box used on trucks, trailers, containers, or similar intermodal units, functions by absorbing heat from the enclosed area and releasing heat outside of the box into the environment. To accomplish this, a typical transport refrigeration unit requires a highly pressurized refrigerant is introduced into a low pressure environment such as an evaporator coil. The refrigerant is pressurized by flowing through a compressor, which can be powered by a generator run off of a diesel engine.

Refrigeration systems, including particularly refrigeration transport systems, require operation under a wide variety of ambient temperatures and operating loads. Excessive voltage generated by certain operating conditions is believed to be a significant factor in causing component failures on the transport refrigeration system. Currently available transport refrigeration systems include a speed solenoid for dropping or limiting engine speed to a preselected maximum rate. Unfortunately, the engine speed control systems that applicant is currently aware of involved manual selected activation of the speed solenoid or similar engine speed control.

The applicants have found that, in order to operate under acceptable voltage conditions, it is desirable to automatically monitor and control the voltage conditions of the system based upon the engine speed, generator temperature and current draw of the system.

SUMMARY OF THE INVENTION

The control method and process of this invention provides a refrigeration unit for a transport system having a controller for predicting and preventing high voltage conditions on the unit. The system includes sensors for monitoring engine speed, current draw and generator temperature (which reflects the ambient load). The data received from these sensors is loaded into the system controller, which utilizes a map, or more preferably an algorithm to predict voltage based upon those variable. If the algorithm or map predicts a voltage above preselected acceptable voltage levels programmed into the controller, then the system will drop the engine into low speed. Most preferably, this function would be accomplished by a digital signal generated by the controller to de-energize the speed solenoid connected to the engine, thus limiting engine speed.

Accordingly, one object of the present invention is to provide a microprocessor control for the regulation of transport refrigeration unit voltage levels.

It is another object of the present invention to provide a method or process for limiting or eliminating transport refrigeration unit component failure rates by automatically controlling voltage limits on the unit.

These and other objects, features, and advantages of the present invention will become more apparent in light of the following detailed description of a best mode embodiment thereof, and as illustrated in the accompanying drawings.

BRIEF DESCRIPTION OF THE DRAWINGS

FIG. 2a shows a block schematic of a second preferred embodiment of a controller of the present invention.

DETAILED DESCRIPTION OF THE INVENTION

The invention that is the subject of the present application is one of a series of applications dealing with transport refrigeration system design and control, the other copending applications including: "Superheat Control for Optimum Capacity Under Power Limitation and Using a Suction Modulation Valve" (U.S. patent application Ser. No. 09/277,508); "Economy Mode For Transport Refrigeration Units" (U.S. Pat. No. 6,044,651); "Compressor Operating Envelope Management" (U.S. patent application Ser. No. 09/277,473); "High Engine Coolant Temperature Control" (U.S. patent application Ser. No. 09/277,472); "Generator Power Management" (U.S. patent application Ser. No. 09/277,509); and "Electronic Expansion Valve Control Without Pressure Sensor Reading" (U.S. patent application Ser. No. 09/277,333) all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" Electrically Powered Trailer Refrigeration Unit With Integrally Mounted Diesel Driven Permanent Magnet Generator;" and "Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference.

Figure 1:
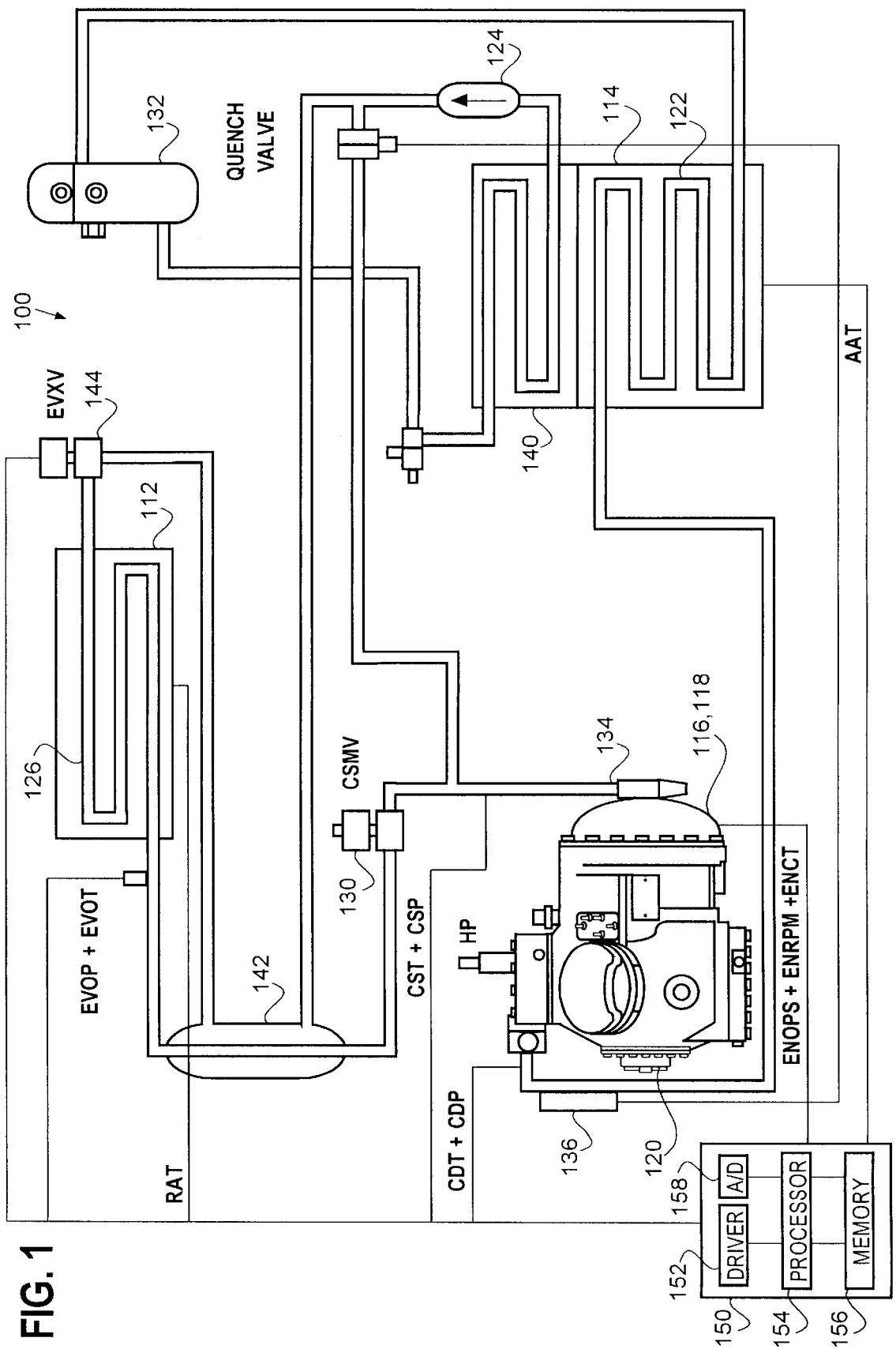
FIG. 1 shows a schematic of the transport refrigeration system of the present invention.

FIG. 1 illustrates a schematic representation of the transport refrigeration system 100 of the present invention. The refrigerant (which, in its most preferred embodiment is R404A) is used to cool the box air (i.e., the air within the container or trailer or truck) of the refrigeration transport system 100. is first compressed by a compressor 116, which is driven by a motor 118, which is most preferably an integrated electric drive motor driven by a synchronous generator (not shown) operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cyliinder compressor 116 having a displacement of 600 cc, the compressor 116 further having two unloaders, each for selectively unloading a pair of cylinders under selective operating conditions. In the compressor, the (preferably vapor state) refrigerant is compressed to a higher temperature and pressure. The refrigerant then moves to the air-cooled condenser 114, which includes a plurality of condenser coil fins and tubes 122, which receiver air, typically blown by a condenser fan (not shown). By removing latent heat through this step, the refrigerant condenses to a high pressure/high temperature liquid and flow to a receiver 132 that provides storage for excess liquid refrigerant during low temperature operation. From the receiver 132, the refrigerant flows through subcooler unit 140, then to a filter-drier 124 which keeps the refrigerant clean and dry, and then to a heat exchanger 142, which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the exhanger 112 through a suction modulation valve (or "SMV") back into the compressor.

Figure 2:
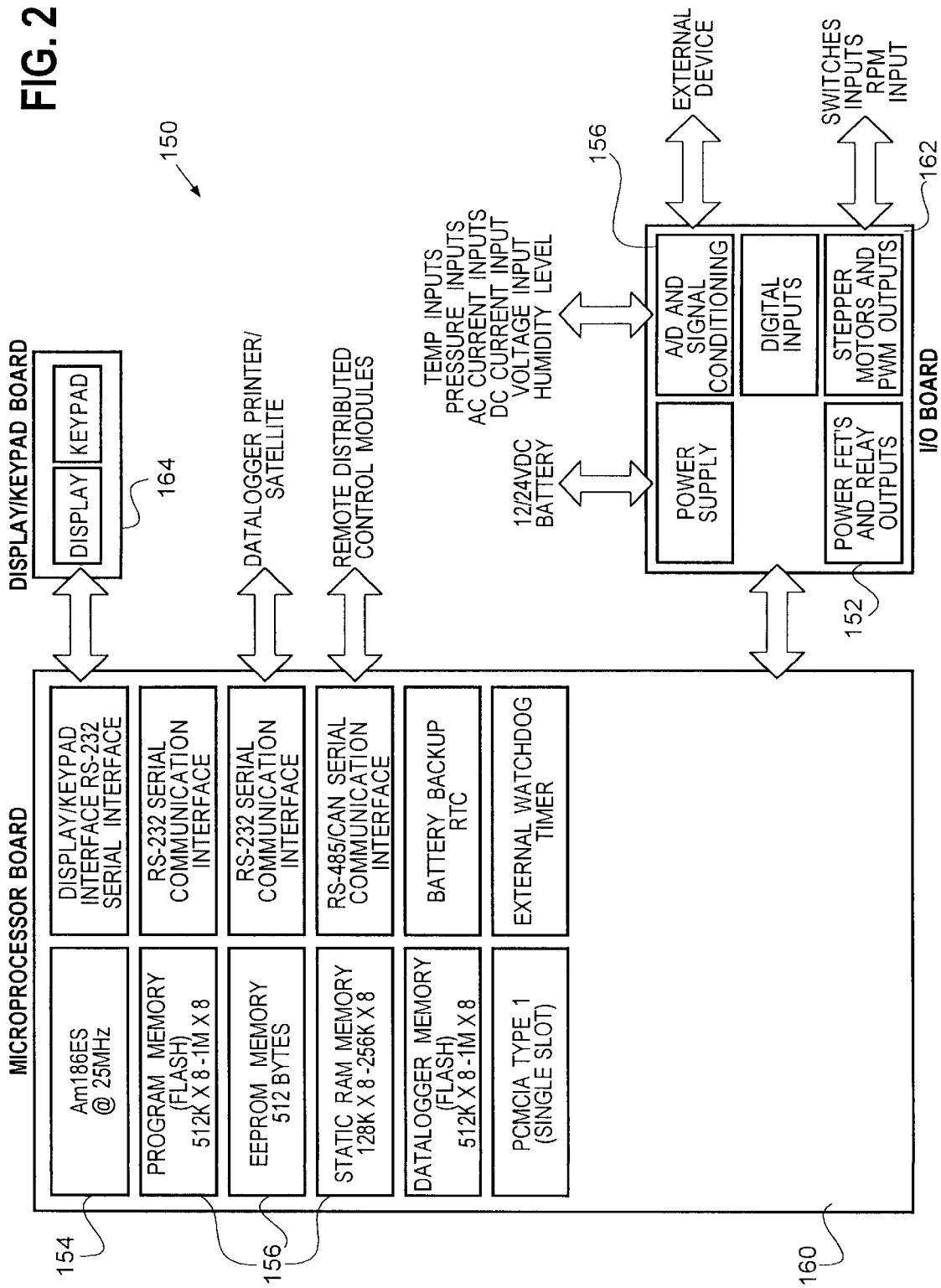
FIG. 2 shows a block schematic of a first preferred embodiment of a controller of the present invention.

Many of the points in the transport refrigeration system are monitored and controlled by a controller 150. As shown in FIGS. 2 and 2A Controller 150 preferably includes a microprocessor 154 and its associated memory 156. The memory 156 of controller 150 can contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FETs") and relays which receive signals or current from the controller 150 and in turn control various external or peripheral devices in the system 100, such as SMV 130, EXV 144 and the speed of engine 118 through a solenoid (not shown).

Among the specific sensors and transducers most preferably monitored by controller 150 includes: the return air temperature (RAT) sensor which inputs into the processor 154 a variable resistor value according to the evaporator return air temperature; the ambient air temperature (AAT) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVOT) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable voltage according to the compressor suction value of compressor 116; the compressor discharge pressure (CDP) transducer, which inputs to microprocessor 154 a variable voltage according to the compressor discharge value of compressor 116; the evaporator outlet pressure (EVOP) transducer which inputs to microprocessor 154 a variable voltage according to the evaporator outlet pressure or evaporator 112; the engine oil pressure switch (ENOPS), which inputs to microprocessor 154 an engine oil pressure value from engine 118; direct current and/or alternating current sensors (CT1 and CT2, respectively), which input to microprocessor 154 a variable voltage values corresponding to the current drawn by the system 100 and an engine RPM (ENRPM) transducer, which inputs to microprocessor 154 a variable frequency according to the engine RPM of engine 118.

Figure 3:
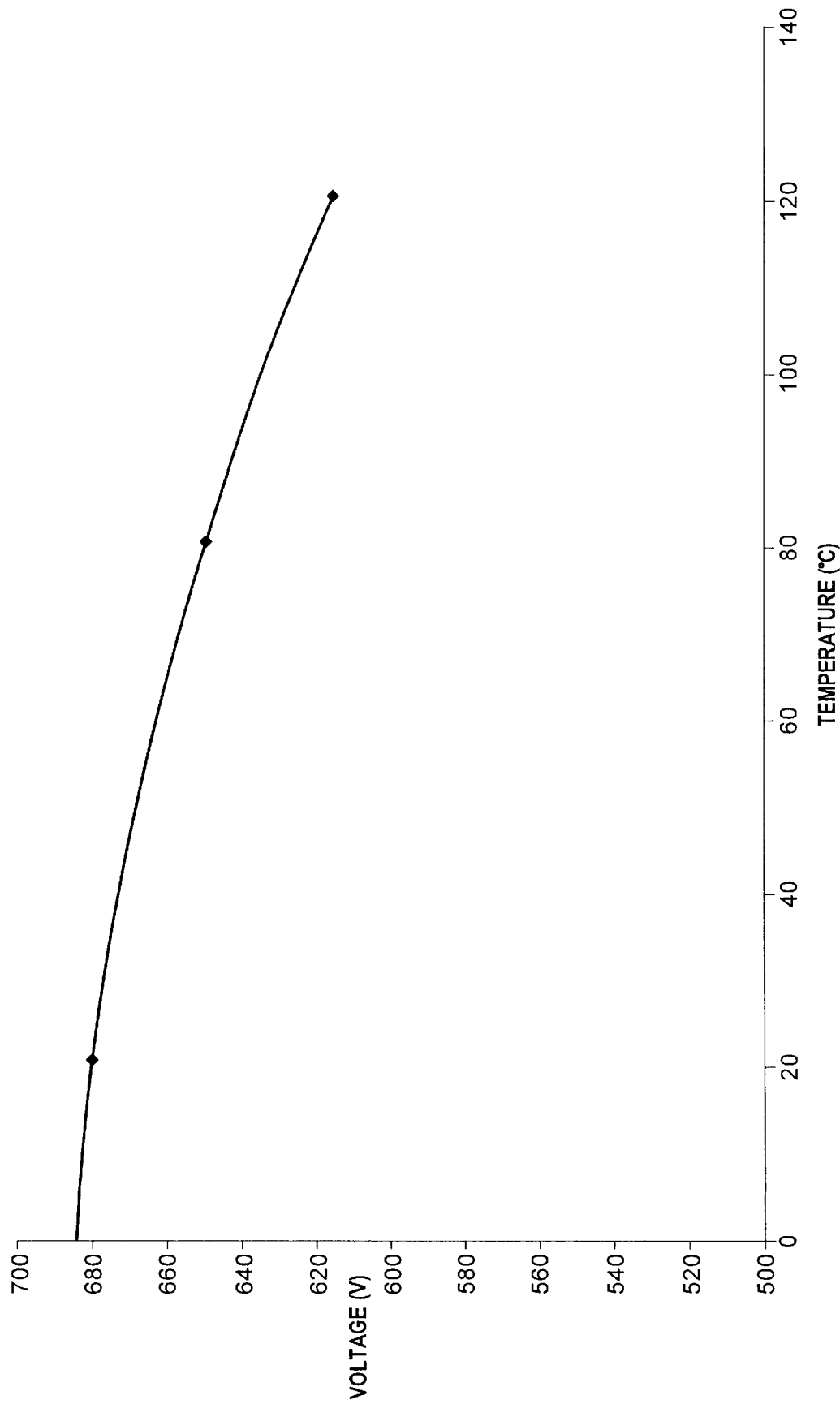
FIG. 3 shows a sample prediction curve or operating parameter model showing the interrelationship between generator temperature versus no load voltage at high engine speed for the preferred embodiment of the present invention.

The present invention preferably involves use of an algorithm by controller 150. The system current (e.g. CT2) and GENT values are input into controller 150 and are used by the processor 154 in implementing the algorithm to predict the voltage for the system 100. A sample prediction curve or model showing the interrelationship between generator temperature versus no load voltage at high engine speed for the preferred embodiment of the present invention is shown in FIG. 3. This predicted voltage is then compared to a voltage limit mapped or stored in memory 156 (those of skill in the art will appreciate that the specific voltage level limits involved will vary based upon system components and operating conditions). If the predicted voltage is higher than the voltage limit stored in memory (i.e., if high or variable voltage conditions are predicted above the preselected voltage limit stored in memory 156), then controller 150 issues a control signal forcing engine 118 into low speed. Alternatively, or in addition to the system current and generator temperature operating parameters, the algorithm employed by the processor 154 of the present invention can employ the value received for the speed of the engine 118 or ENRPM in calculating the predicted voltage.

It will be appreciated by those skilled in the art that various changes, additions, omissions, and modifications can be made to the illustrated embodiments without departing from the spirit of the present invention. All such modifications and changes are intended to be covered by the following claims.

We claim:

1. A process for monitoring and limiting high voltage conditions in an electrically powered transport refrigeration unit, said electrically powered transport refrigeration unit including at least an engine and a generator, said process comprising the steps of:

i monitoring an drive parameter of said transport refrigeration unit;

ii comparing said drive parameter to an operating parameter model within the microprocessor of said transport refrigeration unit;

iii selectively decreasing the speed of the engine in response to drive parameters which exceed predetermined limits of the operating parameter model.

2. The process of claim 1, wherein the drive parameters being monitored are selected from the group consisting of current draw, engine speed, and the temperature of the generator.

3. The process of claim 1, wherein the drive parameter being measured is the temperature of the generator.

4. The process of claim 1, wherein the step of selectively decreasing speed comprises lowering a two speed engine from high speed to low speed.

5. A process for monitoring and variable controlling voltage conditions in a electrically powered transport refrigeration units, said process comprising the steps of:

i monitoring a generator for generator current and generator temperature levels, said generator being located within said transport refrigeration unit;

ii comparing said generator current and generator temperature to an operating parameter model within the microprocessor of said transport refrigeration unit;

iii selectively varying the speed of the engine in response to operating parameters which vary from predetermined limits of the operating parameter model.

\* \* \* \* \*